(No Model.)
W. I. LEE.
BAKING PAN.
No. 289,667. Patented Dec. 4, 1883.
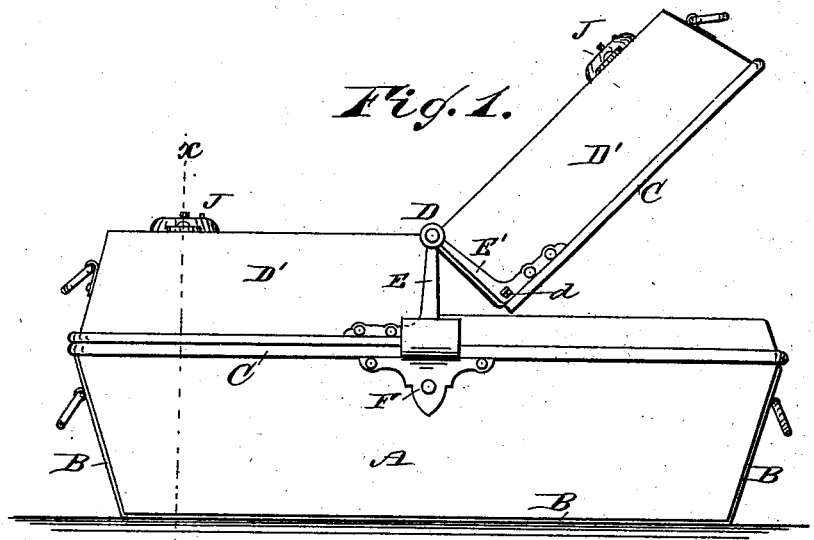
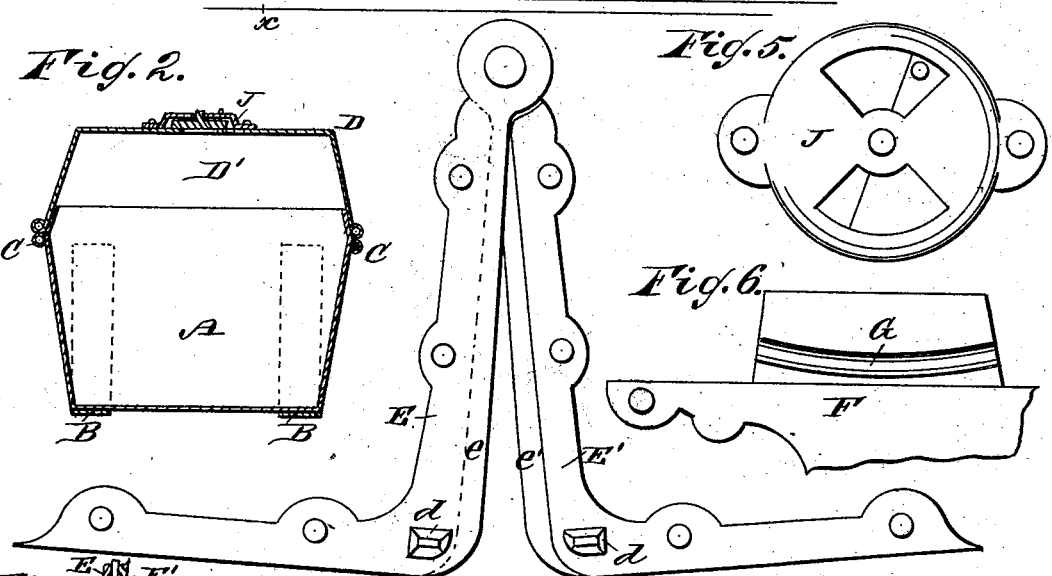
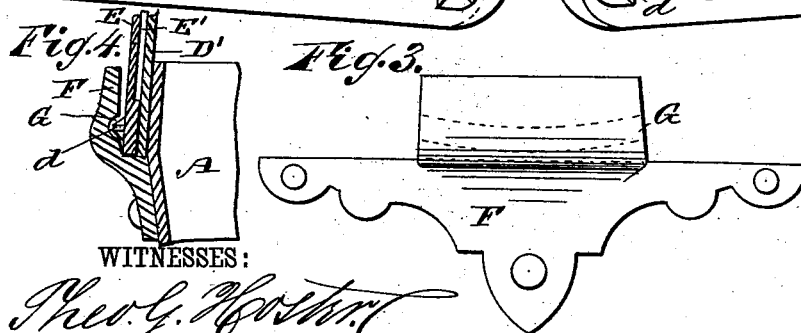
WITNESSES:
INVENTOR:
BY
ATTORNEYS.

UNITED STATES PATENT OFFICE.

WASHINGTON I. LEE, OF PEEKSKILL, NEW YORK.

BAKING-PAN.

SPECIFICATION forming part of Letters Patent No. 289,667, dated December 4, 1883.

Application filed April 6, 1883. (No model.)

*To all whom it may concern:*

Be it known that I, WASHINGTON I. LEE, of Peekskill, Westchester county, New York, have invented a new and Improved Baking-Pan, of which the following is a full, clear, and exact description.

The object of my invention is to provide a new and improved baking-pan for baking bread, meats, &c., in the most perfect manner.

Reference is to be had to the accompanying drawings, forming part of this specification, in which similar letters of reference indicate corresponding parts in all the figures.

Figure 1 is a longitudinal elevation of my improved baking-pan, showing half of the cover raised. Fig. 2 is a cross-sectional elevation of the same on the line $x\ x$, Fig. 1. Fig. 3 is an enlarged detail side view of the hinge-pieces and locking device of the cover. Fig. 4 is an enlarged detail cross-sectional elevation of the cover at the hinge, and Fig. 5 is an enlarged detail plan view of the valve in the cover. Fig. 6 is a face view of the inner side of one of the jaw-plates.

The baking-pan A is made of sheet-iron in the usual oblong shape, and to the bottom and ends of the same a sheet-iron strip, B, or thin cast-iron plate is riveted at each side, which strips or plates form supports for the pan, so that the bottom of the same will not come in contact with the hot stove-plate, and the contents of the pan will not be burned. A horizontal bead, C, or ridge is formed in the outer surface of the sides and ends of the pan a short distance below the upper edge, on which bead or ridge the lower edge of the cover D is to rest, so that the lower parts of the inner surface of the sides and ends of the cover will rest against the outer surface of those parts of the sides and ends of the pan above the bead C. The cover D is formed of two sections, D' D', hinged to each other at the lap of the sections. An L-shaped hinge-piece, E, is secured to the outer surface of each side of one section D' at the hinged end of the said section, and a hinge-piece, E', is secured to the outer surface of each side of the other section D' at the hinged end, which hinge-pieces are pivoted to each other at their upper ends, on which pivots the sections can then swing. The hinge-pieces E are provided with rabbets $e$ on the inner surfaces at the free edges, and the hinge-pieces E' are provided with like rabbets, $e'$, in the outer surfaces at the free edges, which rabbets fit against each other, so that when the sections D' D' are both swung down the outer surfaces of the hinge-pieces will be flush. The hinge-pieces E E' are each provided at the lower ends of the vertical shank with an outwardly-projecting stud, $d$. In place of the L-shaped hinge-pieces E E', straight pieces may be used, the horizontal shanks being dispensed with; but I prefer to use them as shown, as they materially strengthen the corner of the cover. To the outer surface of each side of the pan a jaw-plate, F, is attached, the upper edge of which is almost flush with the upper edge of the pan, and the upper part of which jaw-plate is such a distance from the outer surface of the side of the pan that the side of the cover and the hinge-piece E or E' can pass in between the inner surface of the jaw-plate and the outer surface of the upper part of the jaw, as shown in Fig. 4. The bottom of the recess thus formed in the inner surface of the jaw-plate is flush with the top of the bead C. Each jaw-plate F is provided in its inner surface with a downwardly-curved groove, G, adapted to receive the studs $d$. Each cover-section D' is provided near the end with an aperture, which can be closed by a valve, J. The pan and the cover are provided with suitable handles. If desired, the cover can be made of one piece instead of two hinged sections, as shown.

The pan is used in the following manner: The cover is placed on the pan, the studs $d$ in the hinge-pieces passing into the curved grooves G in the jaw-plates, and thereby locking the cover in place on the pan. The valves are closed, and thus the moisture contained in the article being baked cannot escape, and the article can be baked very rapidly. In baking meats it will not be necessary to add water, as the moisture of the meat, which moisture is retained, will be sufficient. If bread, &c., is to be browned, the valves J can be opened more or less. One section of the cover can easily be opened to examine the contents of the pan, the studs $d$ passing out of the curved grooves G. The stud $d$ of the one section D' holds it in place on the pan while the other section is being raised. As the lower part of the cover overlaps the upper part of the pan, a very tight joint will be formed, and no moisture nor fumes can escape.

Having thus described my invention, I claim as new and desire to secure by Letters Patent—

1. The combination, with a baking-pan, of a cover formed of two sections hinged to each other, studs projecting from the lower inner corners of each section, and of jaw-plates attached to the outer surfaces of the sides of the pan at the middle, which jaw-plates are each provided with a curved groove in the inner surface, substantially as herein shown and described, and for the purpose set forth.

2. The combination, with a baking-pan, of a cover formed of two sections, D', hinged to each other, joint-pieces E E', secured to the inner ends of the cover-sections, which joint-pieces are provided with studs $d$, and the jaw-plates F, secured to the outer surfaces of the sides of the pan at the middle, which jaw-plates are provided at their inner surfaces with curved grooves, substantially as herein shown and described, and for the purpose set forth.

WASHINGTON I. LEE.

Witnesses:
ISAAC R. SECOR,
HARRY M. WEBSTER.